A. LANE & J. H. CULLOM.
Tobacco-Knife.

No. 165,104.

Patented June 29, 1875.

Attest:
Thos. C. Morris
Thos. McNally

Inventors:
Alfred Lane
John H. Cullom

UNITED STATES PATENT OFFICE.

ALFRED LANE AND JOHN H. CULLOM, OF CHARLOTTE, TENNESSEE.

IMPROVEMENT IN TOBACCO-KNIVES.

Specification forming part of Letters Patent No. 165,104, dated June 29, 1875; application filed July 18, 1874.

*To all whom it may concern:*

Be it known that we, ALFRED LANE and JOHN H. CULLOM, of Charlotte, Dickson county, Tennessee, have invented a new and original Tobacco-Knife; and we do hereby declare that the following is a full and exact description thereof, reference being had to the accompanying drawings, and to the letters of reference marked thereon.

The nature of our invention consists in furnishing a double-edged blade with a guarded handle, made up of two parts at right angles to each other.

To enable others to make and use our invention, we will proceed to describe its construction.

Figure 1:
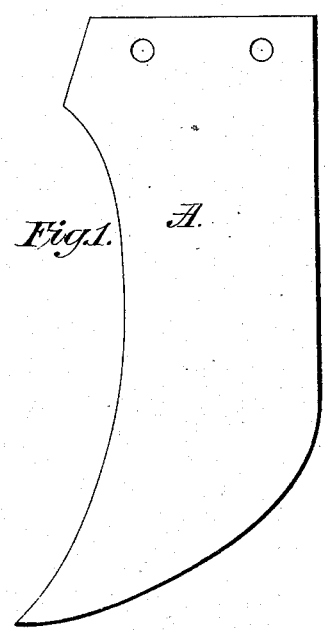
Figure 2:
Figure 4:
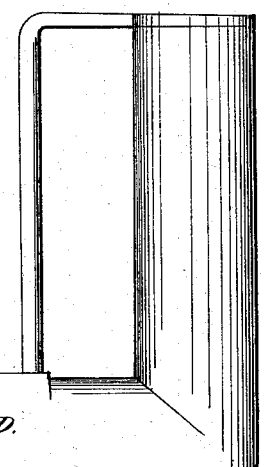
Figure 3:
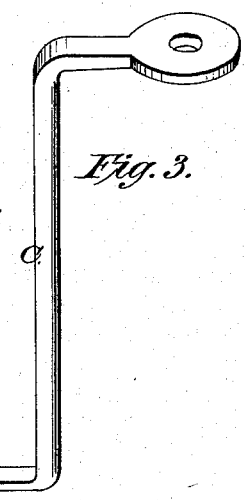

Referring to the drawing which accompanies this specification, letter A, Figure 1, represents the blade of steel, both edges sharp from heel to point, five and one-half inches long, two inches wide; heel of blade two and three-fourths inches wide, with two screw-holes in it. Letter B, Fig. 2, represents the handle of natural crooked wood. The stem, to which blade is attached, is six and one-fourth inches in length, one and one-fourth inch in diameter, with end sawed in for blade, with two holes for screws to fasten in the blade; the handle to stem, Fig. 2, from outside shoulder, five and one-half inches long—same diameter as the other—with screw-hole in the end of the handle. Letter C, Fig. 3, represents the guard to the handle, of iron or brass, to fit the handle and stem. It is let into the stem and screwed to it, and also screwed to the end of the handle. Letter D, Fig. 4, is the knife complete.

In using it, first split the tobacco-plant down with the rounding edge, and then cut off the plant with the upper or curved edge.

We claim as our invention—

The double-edged blade A, combined with the guarded handle, whose two parts, of same piece of wood, are at right angles with each other, all as and for the purposes described.

ALFRED LANE.
JOHN H. CULLOM.

Attest:
THO. C. MORRIS,
THOS. MCNEILLY.